United States Patent [19]

Morin

[11] 4,311,262
[45] Jan. 19, 1982

[54] ROD AND REEL CADDY

[76] Inventor: LeRoy D. Morin, 3602 Hampshire Ave. North, Minneapolis, Minn. 55427

[21] Appl. No.: 122,444

[22] Filed: Feb. 19, 1980

[51] Int. Cl.³ ............................................. A01K 93/00
[52] U.S. Cl. ..................... 294/141; 206/443; 224/922; 43/54.5 R; 43/21.2; 211/62; 211/60 R; 294/159
[58] Field of Search ............... 224/45 Q, 46 R, 46 T, 224/44.5, 920, 922; 206/201, 202, 203, 443; 248/145.6; 211/60 R, 60 G, 60 M, 60 T, 62, 68; 220/22, 22.1, 22.3; 43/21.2, 54.5 R; 17/55, 70

[56] References Cited

U.S. PATENT DOCUMENTS

| | | | |
|---|---|---|---|
| 160,339 | 3/1875 | Ladd | 211/62 |
| 877,145 | 1/1908 | Waddell | 211/60 R X |
| 2,625,308 | 1/1953 | Green | 224/46 T |
| 2,663,605 | 12/1953 | Oliver | 211/60 M X |
| 2,781,958 | 7/1973 | Lewandowski | 224/922 X |
| 3,674,190 | 7/1972 | Wright | 224/922 X |
| 3,745,692 | 7/1973 | McGee | 43/242 X |
| 4,073,085 | 2/1978 | Stremeckus | 43/54.5 R |

Primary Examiner—Steven M. Pollard
Attorney, Agent, or Firm—Kinney, Lange, Braddock, Westman and Fairbairn

[57] ABSTRACT

A fishing rod carrier device useful as a rod and reel caddy for transporting fishing rods with reels mounted on the rod. The carrier device includes a frame which is suitable for resting on relatively flat surfaces, a lower horizontal member mounted on the frame above the bottom of the frame and having a plurality of openings spaced from one another such that the openings are larger than a fishing rod handle and smaller than a fishing reel on the rod. An upper horizontal member is also mounted on the frame above the lower horizontal member and having a like plurality of similarly sized openings relatively vertically aligned with the openings of the lower member. Also included is a first vertical member mounted adjacent to the upper member and extending upwardly to an end having a handle means thereon. A support means is attached to the vertical member to maintain the vertical member perpendicular to the horizontal members.

13 Claims, 8 Drawing Figures

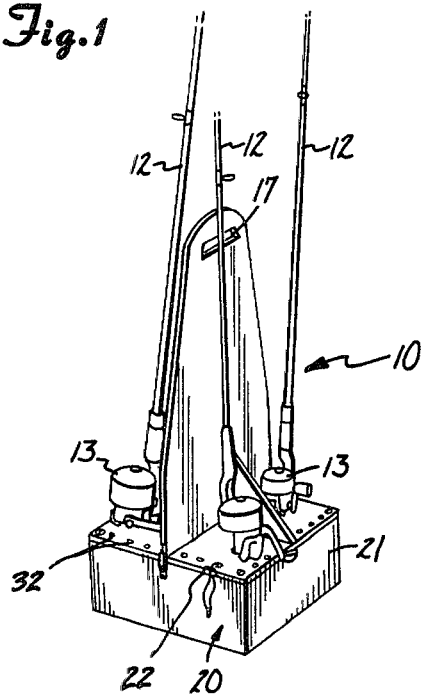
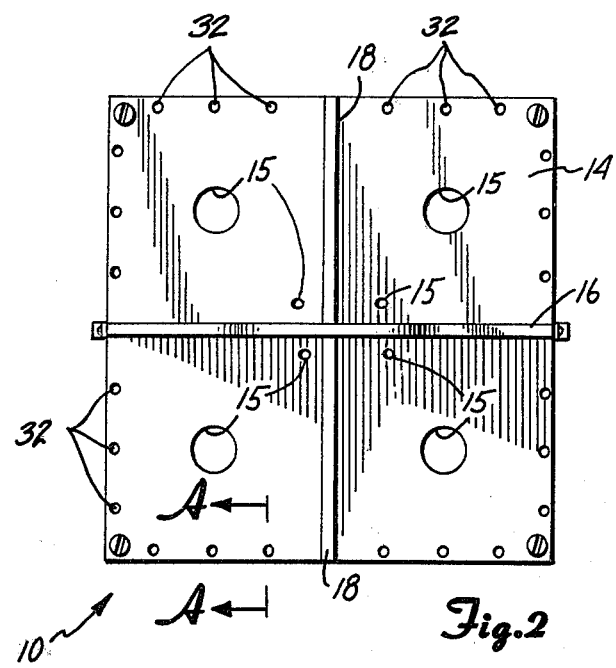
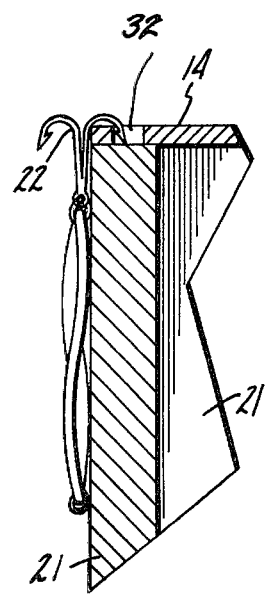
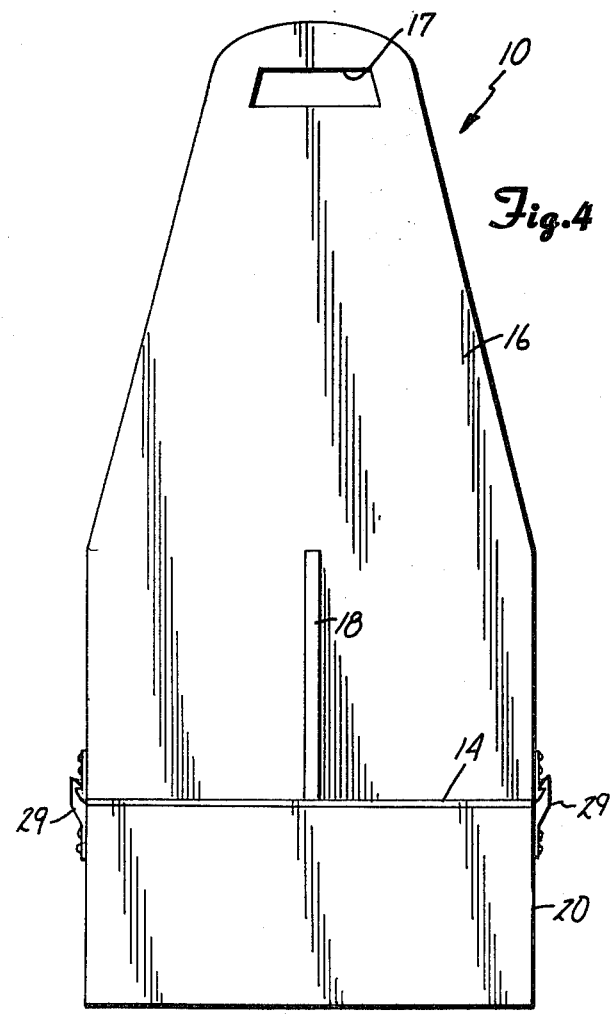

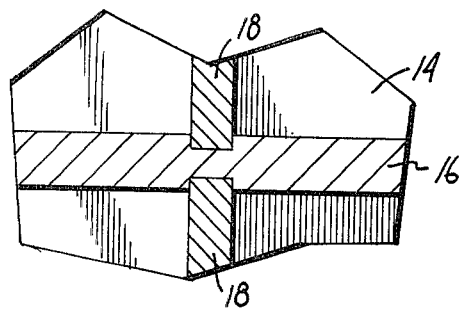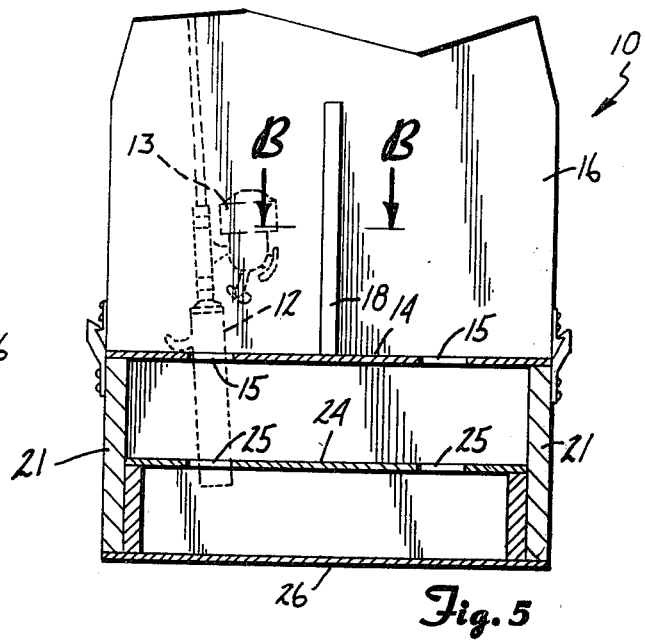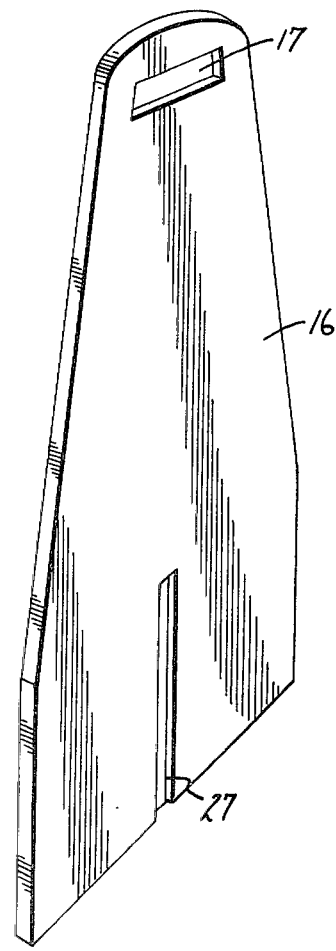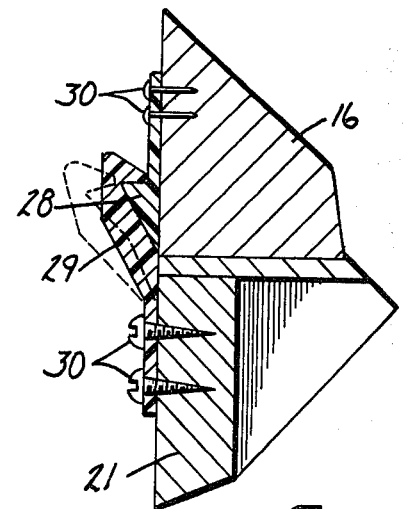

ROD AND REEL CADDY

BACKGROUND OF THE INVENTION

1. Field of the Disclosure

Ever since man has challenged the fish of the seas he has attempted to devise equipment which makes fishing either easier or more productive. A myriad of fishing lures are available for use with a wide variety of fishing rods and reels, each with individual particular features for special purposes. Rods and reels have also been produced in a multiplicity of designs for various purposes, sometimes such that a fisherman needs or thinks he needs more than one rod and reel combination for successful fishing.

Moreover, due to the overwhelming popularity of the sport of fishing, many times groups of fishermen fish together, jointly occupying a small boat or a particularly suitable portion of the shore. Whether alone or in a group, however, fishermen universally recognize that the rod and reel must be protected from damage, not so much during use, although each fisherman hopes to catch a true monster of the deep, but during travel to and from the water and during periods of nonuse.

The present invention relates to a safe, practical and convenient device which is useful in carrying one or more fishing rods and reels in a ready-to-use condition without concern for common mishaps, such as broken rods, tangled lines and contaminated reel parts.

2. Prior Art

Various devices have heretofor been proposed in the prior art for transporting or holding fishing equipment. Most always, the prior art devices require clamping the rod or the reel or otherwise attaching or detaching something to secure the rod to the carrier. This oftentimes leads to tangled lines, broken rods and ultimately misuse of the equipment carrier.

U.S. Pat. No. 4,176,819 discloses a portable fishing rod holder which can be pushed into the ground for stability. This holder uses a pair of plates having holes to hold the rod handles at an angle away from the center axis. No parts extend upward for carrying the device, and in fact the device would be substantially unstable without the center shaft being adequately stuck in the ground.

U.S. Pat. No. 3,674,190 discloses a rod carrier wherein a covering is wrapped around a base to protect the reels, while the rods are removably mounted on the vertical member in a secure fashion. The device employs inherent bending of the rods for tension to hold the rods in place.

U.S. Pat. No. 3,575,327 discloses a flexible fishing rod carrying case which comprises a plurality of pockets and ties to hold a plurality of rods which are then rolled up like a blanket.

U.S. Pat. No. 4,133,131 teaches the use of a dual form fishing rod holder which clips the rod to the support and adjustably positions the rod in either a storage or use position. Finally, in a related device, U.S. Pat. No. 3,172,585 discloses a golf club carrier using a plurality of radial clamps on a supporting shaft with a cup at one end to protect the handles from the rain.

None of the above devices provides a convenient storage device for fishing rods and reels that is stable for use at the lake, in a boat or in a camper or on a shore. Moreover, the devices described above do not conveniently provide a means for carrying a plurality of rods and reels from one point to another, such as from a boat to the cabin without endangering either the safety of the rod or reel, or permitting the vexing problem of line tangling.

SUMMARY OF THE INVENTION

The present invention comprises a fishing rod carrier device for transporting fishing rods with reels thereon in a manner which permits convenient storage of the rods and reel in transit or during periods of nonuse. The device comprises a frame for resting on relatively flat surfaces and includes a lower horizontal member mounted on the frame above the bottom of the frame and having a plurality of openings spaced from one another. These openings are larger than a fishing rod handle and smaller than a fishing rod reel. An upper horizontal member is also provided on the frame above the lower horizontal member such that it has a like plurality of similarly sized openings relatively vertically aligned with the openings of the horizontal member. A fishing rod with a reel thereon can be positioned so as to place the handle through the upper and lower members, thereby securing the rod and reel. A first vertical member is mounted adjacent the upper member and extends upwardly to an end having a handle means thereon.

This vertical member permits relatively easy carrying of the device containing the rods and reels. A support member is attached to the vertical member to maintain the vertical member in a position relatively perpendicular to the horizontal members.

BRIEF DESCRIPTION OF THE DRAWINGS

For a more complete understanding of the invention, a reference is hereby made to the drawings, in which:

FIG. 1 is a top and side elevational view of a device according to the present invention depicting the carrying of three rods and reels.

FIG. 2 is a top view of the device shown in FIG. 1, without the rods and reels.

FIG. 3 is a sectioned cut-away view along lines A—A of FIG. 2.

FIG. 4 is a side elevational view of the device shown in FIG. 1.

FIG. 5 is a sectioned view of the device of FIG. 4, also showing the inclusion of a fishing rod and reel.

FIG. 6 is a sectioned view taken along lines B—B of FIG. 5.

FIG. 7 is an elevational view showing a part of the device shown in FIG. 1 removed from the remaining device.

FIG. 8 is an enlarged, sectioned view of one corner of the sectioned view shown in FIG. 5.

DETAILED DESCRIPTION OF THE PREFERRED EMBODIMENTS

As shown in the drawings generally, and particularly in FIG. 1, a fishing rod carrier device shown generally by the reference numeral 10 is provided for transporting a plurality of rods 12 having reels 13 mounted thereon. The device includes a frame 20 having sides 20 and 21.

As shown in FIG. 5, a lower horizontal member 24 is mounted on frame 20 and is positioned above the bottom of the frame 20. The lower horizontal member 24 has a plurality of openings 25 spaced from one another and larger than the fishing rod handle 12, but smaller than the fishing reel 13 mounted on the rod 12. Positioned above the lower member 24 is an upper horizontal member 14 mounted on the frame 20 and having a like plurality of openings 15 of similar size to openings 25 in plate 24. The openings 15 and 25 are relatively vertically aligned with one another.

A first vertical member 16, as shown in FIG. 4, is mounted on frame 20 adjacent to upper horizontal member 14 and extending upwardly toward an end having a handle means 17 mounted thereon. A support means 18, as shown in FIG. 2 and elsewhere, is attached to the vertical member 16 to maintain said vertical member 16 perpendicular to the horizontal member 14. This support may be in the form of a tongue and groove construction such as shown in FIG. 6.

In a preferred embodiment, it is desirable to provide a bottom means 26, as shown in FIG. 5, attached to the frame 20 for prevention of the passage of fishing rods 12 through the bottom of the device. This optional embodiment provides protection from external protuberances such as rocks which might otherwise damage the handle 12 of the fishing rod.

In another preferred embodiment, the vertical member 16 may be adjustably removable from the remaining portion of the device such that fastener 29 as shown in FIG. 8 attached to catch 28 thereby securing the upper member 16 to the frame 20. Screws 30 may be employed to mount the fastener 29 and the catch 28.

As shown in the Figures, vertical member 16 has two major surfaces which are flat and generally parallel to one another. Vertical member 16, therefore, can be used as a cutting board for cleaning fish when it is removed from the remaining portion of the device. In this embodiment, vertical member 16 is formed from a relatively hard wood or plastic material.

In a preferred embodiment, as shown in FIG. 2, the horizontal member 14 contains four large aligned openings 15 such that the vertical member 16 and the support means 18 each separate a pair of the openings 15, whereby adjacent openings 15 are isolated from one another. Of course, as also shown in FIG. 2 additional openings could be provided of a smaller size so as to accept fishing rod portions which have been detached from the main fishing rod handle portion having the reel mounted thereon. Additionally, some of the holes or openings 15 can be of a large enough size to accept the fishing rod handle while other openings 15 can be smaller for receiving the upper portion of a particularly long fishing rod. In order to more securely hold rods 12, openings 15 and 25 are, in one preferred embodiment, lined with a thin foam or spongy material.

In still another embodiment of the present invention, holes 15 and 25 are positioned to receive interchangeable inserts which have a cavity for receiving and holding particular types of fishing rod handles. Different inserts are provided for straight and curved fishing rod handles. In other words, the holes 15 and 25 hold the inserts, and the fishing rod handles are held within the cavities of the inserts.

As shown in FIGS. 1-3, upper horizontal member 14 has a plurality of small holes 32 at spaced locations along the outer edges. Holes 32 allow the fisherman to store plugs or other lures by placing hook 22 into hole 32. In the embodiment shown in FIGS. 1-3, a total of twenty-four holes (six along each edge) are provided, so that a total of twenty-four plugs can be stored at the same time.

While it is possible to construct the device of the present invention in a variety of sizes and from a variety of materials, it is preferred that the upper and lower horizontal members 14 and 24, as shown in FIG. 5, are at least 5 centimeters apart to permit adequate support at two places on the fishing rod handle. Also preferred is to ensure that the lower member 24 is at least 4 centimeters above the bottom of the frame 20 or the bottom plate 26 if one is employed. One additional embodiment, which is particularly important when the device of the present invention is being used in a boat or near a relatively large body of water, is the use of a buoyant material such as polystyrene, foamed polyurethane, and other extremely lightweight materials for the vertical member 16. If the buoyancy of the vertical member 16 is sufficient with respect to water, it will be capable of supporting in water the device and for fishing rods with reels attached thereto while maintaining the handle portion 17 of the vertical member 16 above water level.

The rod and reel caddy device of the present invention has many important advantages. First, frame 20 provides a stable base for supporting the rods and reels, whether in a lake cabin, a home, a camper vehicle, a car or a boat. Because of its stability, the device presents the rods and reels from tipping over and falling in the sand, mud or lake. This prolongs the life of the rods and reels.

Second, the device makes it easy to carry fishing rods and reels down to the boat, lake or river. In the embodiments shown, four reels and rods may be carried with a single device. This is the average number of lines used in a boat by a family.

Third, the device prevents lines from being tangled up when carrying the reels and rods, and also prevents the rods and reels from being broken.

Fourth, the device is particularly advantageous when fishing from the bank of a river or shore of a lake. The device sits stably on the ground, or any other flat surface, and may be used as a holder on the shore or bank so that the fisherman does not have to rest the rods and reels on rocks, or lay them down in the sand.

Fifth, the device is also particularly useful when fishing from a boat. The device may be set flat on the bottom of the boat or on a seat, thereby making it convenient to work on the rods and reels or to fix the line. This also makes the rods and reels readily available to use for fishing. The device acts as a "third hand" to hold the rod and reel while leaving the two hands of the fisherman free for other tasks.

Sixth, the device makes a convenient storage device when the rods and reels are at home, and not in use.

Seventh, the storage device permits rods and reels to be left in a boat while traveling to and from a lake or river.

Eighth, the device helps prevent theft because it makes it particularly easy to carry rods and reels from the boat to a cabin, campsite or the like.

Ninth, the device is easily transportable, since it can be set in a camper, can be left in a boat, or can be laid on its side in the trunk or back seat of a car while transporting the rods and reels to and from the lake, cabin or home.

Although the present invention has been described with reference to the preferred embodiment persons skilled in the art will recognize that changes may be made in form and detail without departing from the spirit and scope of the invention.

What is claimed is:

1. A fishing rod carrier device for transporting fishing rods with reels thereon, comprising:
   a frame having a bottom for permitting the frame to rest on relatively flat surfaces when the fishing rod carrier device is in an upright position and having at least one flat side for permitting the frame to lie on the flat side when the fishing rod carrier device is in a generally horizontal position;

a lower horizontal member mounted on said frame above the bottom of said frame and having a plurality of openings spaced from one another, said openings being larger than a fishing rod handle and smaller than a fishing reel mounted on said rod;

an upper horizontal member mounted on said frame above said lower horizontal member and having a like plurality of similarly sized openings relatively vertically aligned with the openings of said lower horizontal member;

a first vertical member having first and second substantially flat, generally parallel major surfaces mounted adjacent to said upper member, and extending upwardly to an end having a handle means thereon; and first and second vertical support means generally orthogonal to and attached to the upper horizontal member and engaging the first and second major surfaces, respectively, of said vertical member to maintain said vertical member perpendicular to said horizontal members, the first and second support means and the vertical member dividing the upper horizontal member into four separate regions, and wherein each separate region has one of the plurality of openings therein.

2. The device of claim 1 which further includes a bottom plate attached to the bottom of said frame for preventing passage of fishing rods therethrough.

3. The device of claim 1 which further includes releasable attachment means for attaching the vertical member to the frame and being releasable to permit detachment of the vertical member from the frame for use as a cutting board.

4. The device of claim 1 in which each separate region further includes additional aligned openings in both said lower member and said upper member for acceptance of fishing rod portions detached from the fishing rod handle portions.

5. The device of claim 1 wherein said lower and upper horizontal members are at least 5 centimeters apart and said lower member is at least 4 centimeters above the bottom of said frame.

6. The device of claim 1 wherein said vertical member is constructed from a buoyant material having sufficient buoyancy with respect to water to support in water said device and a plurality of fishing rods with reels attached thereto while maintaining said handle means above said water.

7. The device of claim 1 which includes a plurality of holes proximate outer edges of the upper member for receiving ends of fish hooks.

8. A fishing rod carrier device for transporting fishing rods with heels thereon, comprising:

a base having a bottom for permitting the base to rest on relatively flat surfaces when the fishing rod carrier device is in an upright position, having at least one flat side for permitting the base to lie on the flat side when the fishing rod carrier device is in a generally horizontal position, and having an upper horizontal member with a plurality of opening means therein for receiving and holding fishing and handles;

a first vertical member having first and second major surfaces mounted adjacent to to said upper horizontal member, and extending upwardly to an end having a handle means thereon; and first and second vertical support means between said upper horizontal member and said vertical member to maintain said vertical member perpendicular to said horizontal member, the first and second support means being generally orthogonal to the upper horizontal member and the first and second major surfaces of the vertical member, the vertical member and the first and second support means dividing the upper horizontal member into four separate regions, and wherein each separate region has one of the plurality of openings therein.

9. The device of claim 8 which further includes a bottom plate attached to the bottom of said base.

10. The device of claim 8 which further includes releasable attachment means for attaching the vertical member to the base, the releasable attachment means being releasable to permit detachment of the vertical member from the base for use as a cutting board.

11. The device of claim 8 which further includes a plurality of opening means in the upper horizontal member for accepting and holding fishing rod portions detached from the fishing rod handle portions.

12. The device of claim 8 in which the base further includes a lower horizontal member mounted below said upper horizontal member and having a like plurality of opening means spaced from one another relatively vertically aligned with the opening means of said upper horizontal member.

13. The device of claim 8 which includes a plurality of holes proximate outer edges of the upper horizontal member for receiving ends of fish hooks.

* * * * *

UNITED STATES PATENT OFFICE
CERTIFICATE OF CORRECTION

Patent No. 4,311,262　　　　　　　　Dated　January 19, 1982

Inventor(s) LeRoy D. Morin

It is certified that error appears in the above-identified patent and that said Letters Patent are hereby corrected as shown below:

Column 6, line 7, "heels" should be --reels--.

line 16, "and" should be --rod--.

Signed and Sealed this

First Day of June 1982

[SEAL]

*Attest:*

*Attesting Officer*　　　　GERALD J. MOSSINGHOFF
　　　　　　　　　　　　　*Commissioner of Patents and Trademarks*